(12) United States Patent
van Doorn et al.

(10) Patent No.: US 9,526,269 B2
(45) Date of Patent: Dec. 27, 2016

(54) MOULDING DEVICE AND METHOD FOR MOULDING A FOOD PRODUCT

(75) Inventors: Hendrikus Cornelis Koos van Doorn, Goch-hassum (DE); Jeroen Robert Willemsen, Veenedaal (NL); Thomas Willem Dekker, Nijmegen (NL); Leon Spierts, Maastricht (NL); Albertus Dunnewind, Wageningen (NL); Martinus Johannes Willebrordus van Zoelen, Den Bosch (NL)

(73) Assignee: Marel Townsend Further Procesing B.V., Boxmeer (NL)

( * ) Notice: Subject to any disclaimer, the term of this patent is extended or adjusted under 35 U.S.C. 154(b) by 117 days.

(21) Appl. No.: 14/118,613

(22) PCT Filed: May 23, 2012

(86) PCT No.: PCT/NL2012/050360
§ 371 (c)(1),
(2), (4) Date: Feb. 6, 2014

(87) PCT Pub. No.: WO2012/161577
PCT Pub. Date: Nov. 29, 2012

(65) Prior Publication Data
US 2014/0141135 A1 May 22, 2014

(30) Foreign Application Priority Data
May 24, 2011 (NL) ...................................... 2006841

(51) Int. Cl.
*A22C 7/00* (2006.01)
*A23P 1/10* (2006.01)

(52) U.S. Cl.
CPC .................. *A23P 1/105* (2013.01); *A22C 7/00* (2013.01); *A22C 7/0069* (2013.01);
(Continued)

(58) Field of Classification Search
CPC ... A22C 7/0023; A22C 7/0069; A22C 7/0092; A22C 17/0006; A22C 7/0076; A22C 7/0084; A23P 1/105
(Continued)

(56) References Cited

U.S. PATENT DOCUMENTS 3,137,029 A * 6/1964 De Zolt .................. A22C 7/00
                                                             100/907
4,370,779 A 2/1983 Meier
(Continued)

FOREIGN PATENT DOCUMENTS

EP 0061995 10/1982
EP 715814 6/1996
(Continued)

OTHER PUBLICATIONS

International Patent Application No. PCT/NL2012/050360, International Search Report & Written Opinion, mailed Sep. 10, 2012, 12 pages.

*Primary Examiner* — Seyed Masoud Malezadeh
(74) *Attorney, Agent, or Firm* — Kilpatrick Townsend & Stockton, LLP

(57) ABSTRACT

A molding device (10) for molding three-dimensional products (76) from a mass of foodstuff comprises a molding roller (16) and a filling device (18). The molding roller (16) has a molding surface with at least one mold cavity (44) which is delimited by a mold cavity (44) opening. The filling device (18) has a dispensing mouth (36) and a pump. The dispensing mouth (36) and the mold cavity (44) opening each have, viewed in the direction of the movement path, a front edge and a rear edge which is situated at a fixed distance thereof. A position-determining device determines the position of the front edge of the mold cavity (44) opening with respect to the front edge of the dispensing mouth during the movement of the mold cavity (44) opening and the
(Continued)

dispensing mouth (36) with respect to each other. A control unit controls the pump on the basis of the position-determining device during the movement of the mold cavity (44) opening and the dispensing mouth (36) with respect to each other.

10 Claims, 5 Drawing Sheets

(52) U.S. Cl.
CPC ............ *A22C 7/0092* (2013.01); *A23P 30/10* (2016.08); *A22C 7/0076* (2013.01); *A22C 7/0084* (2013.01)

(58) Field of Classification Search
USPC ............... 425/127, 195, 218–219, 237, 241, 256,425/363, 365, 402, 447, 449, 576, 572, 588,425/145, 147
IPC ....................................................... A23P 1/105
See application file for complete search history.

(56) References Cited

U.S. PATENT DOCUMENTS

| | | | |
|---|---|---|---|
| 4,460,611 A * | 7/1984 | Suzuki ................... | A21C 11/00 425/204 |
| 4,506,184 A * | 3/1985 | Siddall ................... | B23Q 1/032 279/3 |
| 4,957,425 A * | 9/1990 | Fay ........................ | A21C 5/04 264/335 |
| 5,208,059 A | 5/1993 | Dubowik et al. | |
| 5,534,073 A * | 7/1996 | Kinoshita ............ | B25B 11/005 118/725 |
| 5,923,408 A * | 7/1999 | Takabayashi ........... | G03F 7/707 269/21 |
| 5,980,228 A | 11/1999 | Soper | |
| 6,238,196 B1 | 5/2001 | Hyllstam et al. | |
| 6,572,360 B1 | 6/2003 | Buhlke et al. | |
| 6,809,802 B1 * | 10/2004 | Tsukamoto ............. | G03F 7/707 355/53 |
| 7,018,572 B2 * | 3/2006 | Feist ................... | B29C 45/2632 264/1.33 |
| 7,207,789 B2 * | 4/2007 | Gosz ...................... | A23P 1/105 425/150 |
| 7,597,549 B2 * | 10/2009 | van Esbroeck ........ | A21C 11/00 425/230 |
| 8,215,946 B2 * | 7/2012 | Ganapathisubramanian | B82Y 10/00 425/375 |
| 2005/0003062 A1 | 1/2005 | van Esbroeck et al. | |
| 2005/0220932 A1 * | 10/2005 | van der Eerden ... | A22C 7/0069 426/1 |
| 2007/0228589 A1 * | 10/2007 | Choi ...................... | B82Y 10/00 264/39 |
| 2008/0242205 A1 | 10/2008 | Righele | |
| 2009/0134308 A1 * | 5/2009 | van der Eerden ... | A22C 7/0038 249/137 |
| 2009/0134544 A1 * | 5/2009 | Van Der Eerden .. | A22C 7/0038 264/101 |

FOREIGN PATENT DOCUMENTS

| | | |
|---|---|---|
| EP | 1262111 | 12/2002 |
| EP | 2939543 | 11/2015 |
| GB | 2052350 | 1/1981 |
| WO | 2004002229 | 1/2004 |
| WO | 2005027667 | 3/2005 |
| WO | 2005041697 | 5/2005 |
| WO | 2005107481 | 11/2005 |
| WO | 2008091949 | 7/2008 |
| WO | 2010110655 | 9/2010 |
| WO | 2011005099 | 1/2011 |

* cited by examiner

MOULDING DEVICE AND METHOD FOR MOULDING A FOOD PRODUCT

CROSS REFERENCE TO RELATED APPLICATIONS

This application is the U.S. national phase of International Application No. PCT/NL2012/050360 filed on May 23, 2012, and published in English on Nov. 29, 2012 as International Publication No. WO 2012/161577 A1, which application claims priority to Dutch Application No. 2006841 filed on May 24, 2011, the contents of both of which are incorporated herein by reference.

FIELD OF THE INVENTION

The invention relates to a moulding device for moulding three-dimensional food products from a mass of foodstuff which is suitable for consumption and can be pumped, for example a meat mass.

BACKGROUND OF THE INVENTION

A moulding device for moulding three-dimensional products from a mass of foodstuff is known from WO2004002229. This moulding device comprises a moulding roller having a moulding surface containing several mould cavities for moulding the products from the foodstuff. The mould cavities are, for example, arranged next to one another in the moulding roller in rows in the axial direction of the moulding roller. Each mould cavity defines a mould cavity opening at the moulding surface.

During use, the mould cavities are filled with the foodstuff by a filling device which comprises a dispensing mouth. The moulding roller can be rotated about an axis of rotation by means of a drive device. During the driving motion, the mould cavities of the moulding roller and the dispensing mouth of the filling device move with respect to one another along a movement path. A pump displaces a volume of the foodstuff from the dispensing mouth when the mould cavities are in communication with the dispensing mouth.

The dispensing mouth and the mould cavity opening each comprise, viewed in the direction of the movement path, a front edge and a rear edge which is situated at a fixed distance thereof. The distance between the front edge and the rear edge of the dispensing mouth, viewed in the direction of the movement path, is smaller than the distance between the front edge and the rear edge of the mould cavity opening, viewed in said direction.

In use, the front edge of the mould cavity opening of the mould cavities to be filled moves towards the front edge of the dispensing mouth. When the front edge of the mould cavity opening is situated at a distance from the front edge of the dispensing mouth, the dispensing mouth and the mould cavity to be filled are not in communication with each other and no foodstuff can flow into said mould cavity. The front edge of the mould cavity opening approaches the front edge of the dispensing mouth until said front edges are aligned with respect to each other and the mould cavity opening and the dispensing mouth meet one another.

As soon as the front edge of the mould cavity opening and the front edge of the dispensing mouth start to overlap, a connection is made between the dispensing mouth and the mould cavity opening and foodstuff is transferred from the dispensing mouth into the mould cavity by the action of the pump. The dispensing mouth has a width, viewed in the direction transverse to the movement path, which is such that several mould cavities in one row can be filled simultaneously.

By means of this moulding device, it is possible to mould food products having a consistent shape, volume and weight at high speeds. However, it is difficult to control the speed with which the mould cavities are being filled with the foodstuff. This may result in internal differences in the moulded food products which affect the behaviour of the moulded food product during further processing in different ways, such as the shrinking behaviour during cooking, so that the shape of the cooked products is not consistent. When using this moulding device, there is therefore the risk of a number of undesirable deviations in the shape of the product during consumption.

If a substantially round shape for the cooked product is desired, the food products moulded by means of the moulding roller have an oval shape, which changes into a substantially round shape as a result of cooking. The mould cavity openings of the mould cavities of this moulding device are therefore oval in shape in order to give the cooked product a substantially round shape, even if undesirable deviations resulting from cooking are disregarded. However, from an aesthetic point of view, it is desirable, if the cooked product is to have a substantially round shape, for the moulded food products to be substantially round. Obviously, the substantially round food products also have to remain round after cooking.

OBJECT OF THE INVENTION

It is an object of the invention to provide an improved moulding device, in particular a moulding device for moulding food products which have a uniform shape before and after cooking, for example a substantially round shape.

SUMMARY OF THE INVENTION

This object is achieved, according to the invention, by a moulding device for moulding three-dimensional products from a mass of foodstuff which is suitable for consumption and can be pumped, for example a meat mass, comprising:
  a mould member having a moulding surface in which at least one mould cavity for moulding the products from the foodstuff is arranged, which mould cavity is provided with a mould cavity opening at the moulding surface,
  a filling device for filling the mould cavity of the mould member with the foodstuff, which filling device is provided with a dispensing mouth, and a pump for displacing a volume of the foodstuff from the dispensing mouth,
wherein the mould cavity opening of the mould cavity of the mould member and the dispensing mouth of the filling device can be moved with respect to one another along a movement path by a drive device, and wherein the dispensing mouth and the mould cavity opening each, viewed in the direction of the movement path, comprise a front edge and a rear edge which is situated at a fixed distance thereof, and wherein the distance between the front edge and the rear edge of the dispensing mouth in said direction is smaller than the distance between the front edge and the rear edge of the mould cavity opening in said direction,
wherein the moulding device is provided with:
  a position-determining device, for example a position sensor, for determining and/or detecting the position of the front edge of the mould cavity opening of the mould cavity with respect to the front edge of the dispensing mouth of the filling device during movement of the mould cavity opening of the mould cavity and the dispensing mouth of the filling device with respect to one another, and a control unit which is connected to the position-determining device and to the pump, which control unit is configured to control the pump on the basis of the position-determining device during the movement of the mould cavity opening of the mould cavity and the dispensing mouth of the filling device with respect to one another in such a manner that the pump displaces or transfers a volume of the foodstuff which substantially corresponds to the volume of the mould cavity from the dispensing mouth into the mould cavity while the front edge of the mould cavity opening and the front edge of the dispensing mouth, viewed in the direction of the movement path, move with respect to each other across a predetermined filling length which has been input into the control unit, which filling length is smaller than the distance between the front edge and the rear edge of the mould cavity opening, viewed in the direction of the movement path.

The moulding device according to the invention comprises a mould member having a moulding surface. The moulding surface is provided with one or more mould cavities. The shape of each mould cavity corresponds to the shape of the product to be moulded. On the moulding surface of the mould member, each of the mould cavities is delimited by a mould cavity opening. The mould cavity opening of each mould cavity determines a peripheral edge of said mould cavity on the moulding surface of the mould member.

The mould cavity opening of the mould cavity and the dispensing mouth of the filling device are movable with respect to each other. Preferably, the mould member can be driven by a drive device, while the dispensing mouth is arranged in a fixed position. The filling device comprises an abutment surface which sealingly abuts the moulding surface of the mould member during the movement of the mould member. The dispensing mouth is arranged in the abutment surface. The abutment surface comprising the dispensing mouth seals the mould cavity opening of the mould cavity in the moulding surface while said mould cavity opening moves with respect to the abutment surface along the latter, except if the mould cavity opening of the mould cavity is in connection with the dispensing mouth. As a result thereof, no foodstuff can leak away between the abutment surface of the filling device and the moulding surface of the mould member. If the dispensing mouth is not in communication with the mould cavity opening during the movement of the mould member with respect to the dispensing mouth, the dispensing mouth is sealed by the moulding surface of the mould member.

In order to transfer the foodstuff into a mould cavity, said mould cavity first moves towards the dispensing mouth. If the mould cavity is situated at a distance of the dispensing mouth, the seal between the abutment surface of the filling device and the moulding surface of the mould member prevents foodstuff from being able to pass from the dispensing mouth into the mould cavity. When the mould cavity approaches the dispensing mouth, the front edge of the mould cavity will, at a certain point, adjoin the front edge of the dispensing mouth—the front edges of the mould cavity and the dispensing mouth then touch one another.

According to the invention, the position of the front edge of the mould cavity opening of the mould cavity with respect to the position of the front edge of the dispensing mouth of the filling device during the movement of the mould cavity opening of the mould cavity with respect to the dispensing mouth is detected and/or calculated by the position-determining device and passed on to the control unit. On the basis thereof, the control unit controls the controllable pump in such a way that a volume of the foodstuff sufficient to fill the mould cavity substantially completely is displaced from the dispensing mouth within a filling length which is preset in the control unit. The filling length is smaller than the length of the mould cavity opening, that is to say smaller than the fixed distance between the front edge and the rear edge of the mould cavity opening. The volume of the foodstuff to be transferred by pumping, which corresponds to the volume of the mould cavity, is also preset in the control unit. The control unit controls the pump on the basis of the position-determining device in such a manner that the pressure of the foodstuff in the dispensing mouth is controlled to completely fill the mould cavity within the predetermined filling length. By means of the moulding device according to the invention, it is therefore possible to control the filling length across which the mass of foodstuff is transferred into the mould cavity in order to completely fill the mould cavity. It has been found that, as a result thereof, it is possible to predict more accurately which shape the moulded food product will have after cooking. After cooking, the shape of the food products is relatively uniform.

After the mould cavity has been filled with the foodstuff, the mould member with the mould cavity moves past the dispensing mouth and thereafter, the food product moulded in the mould cavity is removed from the mould cavity. The moulded food products are then packaged in packaging. The moulded food products can be frozen before being packaged. An end user will remove the moulded food products from the packaging and process them further, for example cook them on a contact grill.

The mould cavity opening of the mould cavity may have different shapes. For example, the mould cavity opening of the mould cavity has a substantially round shape. The food products which are moulded therein and are substantially round then remain substantially round after cooking. Obviously, the mould cavity opening may have a different shape than a substantially round shape, for example the shape of a chicken nugget or drumstick.

According to the invention, that it is preferred that the control unit is furthermore configured to control the pump on the basis of the position-determining device during the movement of the mould cavity opening of the mould cavity and the dispensing mouth of the filling device with respect to each other in such a manner that the pump essentially does not displace any foodstuff from the dispensing mouth into the mould cavity from a mutual position of the mould cavity opening and the dispensing mouth in which the front edge of the mould cavity opening and the front edge of the dispensing mouth are aligned with respect to one another and the mould cavity opening and the dispensing mouth meet/touch each other and/or start to partly overlap each other up to a mutual initial filling position of the mould cavity opening and the dispensing mouth in which the front edge of the mould cavity opening and the front edge of the dispensing mouth have been moved past each other across a predetermined distance which has been input into the control unit and the mould cavity opening and the dispensing mouth partly overlap each other, and the pump displaces the volume of the foodstuff which substantially corresponds to the volume of the mould cavity from the dispensing mouth into the mould cavity after the mutual initial filling position has been reached.

As soon as the front edge of the mould cavity moves past the front edge of the dispensing mouth, the dispensing mouth and the mould cavity opening start to partly overlap and a connection is made between the dispensing mouth and the mould cavity. According to the invention, the mould cavity can be filled directly with foodstuff ("starting position=0") when the connection between the dispensing mouth and the mould cavity is accomplished. By contrast, it is preferred according to the invention to delay the dispensing of foodstuff from the dispensing mouth until the front edge of the mould cavity opening has been moved as far as the predetermined distance which has been set in the control unit beyond the front edge of the dispensing mouth ("starting position>0"). The front edge of the mould cavity opening and the front edge of the dispensing mouth then reach the mutual initial filling position. The predetermined distance which is input into the control unit may be equal to 0 or may be greater than 0. The optimum starting position will depend on the shape of the mould cavity, the compressibility of the foodstuff and the flexibility of the moulding device.

Only when the mutual initial filling position has been reached, that is to say when the front edge of the mould cavity opening and the front edge of the dispensing mouth are aligned with respect to each other at the predetermined distance which is set in the control unit, does the pump force the foodstuff into the mould cavity in order to fill the mould cavity. The predetermined distance determines when filling of the mould cavity starts.

If the predetermined distance is greater than 0, the foodstuff is not pressed directly into the mould cavity as soon as the front edge of the mould cavity moves past the front edge of the dispensing mouth and a connection is made between the dispensing mouth and the mould cavity. In the mutual initial filling position where the predetermined distance is greater than 0, the dispensing mouth and the mould cavity opening define a cross-sectional flow area for the foodstuff having a predetermined lower limit. For example, the predetermined distance is between approximately 5-10 mm. Obviously, the predetermined distance which corresponds to the starting position may be larger or smaller.

According to this preferred embodiment of the invention, it is not only possible to set the filling length and the volume of the mass to be pumped in the control unit, but the starting position for filling the mould cavity with the foodstuff can also be input into the control unit. It has been found that as a result it is possible to predict with even greater accuracy which shape the moulded food product will have after cooking. After cooking, the shape of the food products is relatively uniform.

Once the pump starts to displace the foodstuff from the dispensing mouth into the mould cavity, the mould cavity is completely filled within the predetermined filling length. The filling length is smaller than the fixed distance between the front edge and the rear edge of the mould cavity. If the predetermined distance is greater than 0, the filling length is also smaller than the distance, viewed in the direction of the movement path, between the rear edge of the dispensing mouth and the rear edge of the mould cavity opening in the mutual initial filling position.

The filling length is, for example, smaller than 50% or 40% or 30% of the distance between the front edge and the rear edge of the mould cavity opening, viewed in the direction of the movement path. The filling length is, for example, smaller than approximately 20 mm or 15 mm or 10 mm. The fixed distance between the front edge and the rear edge of the mould cavity may in this case be, for example, approximately 100 mm. In other words, the mould cavity is filled relatively quickly. This is advantageous in order to fill the mould cavity in a controlled manner, so that the behaviour of the moulded food products during cooking can be predicted with greater accuracy. Obviously, the above values for the filling length may differ.

In an embodiment, the moulding device is provided with a pressure sensor for detecting the pressure of the foodstuff in the mould cavity and/or the dispensing mouth, and wherein the control unit is configured to control the pump on the basis of the position-determining device and the pressure sensor during the movement of the mould cavity opening of the mould cavity and the dispensing mouth of the filling device with respect to each other in such a manner that, after the front edge of the mould cavity opening and the front edge of the dispensing mouth have been moved with respect to each other across the filling length and the pump has displaced the volume of the foodstuff which substantially corresponds to the volume of the mould cavity from the dispensing mouth into the mould cavity, the pump brings the foodstuff which is situated in the mould cavity to a predetermined pressure which has been input into the control unit.

After the mould cavity has been filled completely with the foodstuff, the dispensing mouth still moves over the mould cavity opening. During this period, the pump may be controlled in such a manner that the foodstuff in the mould cavity is brought to the predetermined pressure level. In this case, an additional amount of foodstuff can be supplied to the mould cavity by pump action in order to build up pressure.

However, it is also possible for the control unit to be configured to control the pump on the basis of the position-determining device during movement of the mould cavity opening of the mould cavity and the dispensing mouth of the filling device with respect to each other in such a manner that, after the front edge of the mould cavity opening and the front edge of the dispensing mouth have been moved with respect to each other over the filling length and the pump has displaced the volume of the foodstuff which substantially corresponds to the volume of the mould cavity from the dispensing mouth into the mould cavity, the pump essentially does not displace any foodstuff from the dispensing mouth into said mould cavity after the front edge of the mould cavity opening has been moved with respect to the front edge of the dispensing mouth, viewed in the direction of the movement path, across the predetermined filling length.

Preferably, the dispensing mouth of the filling device is fitted in a substantially fixed position, wherein the mould cavity opening can be moved along the movement path with respect to the dispensing mouth. In this case, the control unit is configured to control the pump on the basis of the position-determining device during movement of the mould cavity opening of the mould cavity with respect to the dispensing mouth of the filling device in such a manner that the pump displace a volume of the foodstuff which substantially corresponds to the volume of the mould cavity from the dispensing mouth into the mould cavity while the front edge of the mould cavity opening moves with respect to the front edge of the dispensing mouth, viewed in the direction of the movement path, across a predetermined filling length which has been input into the control unit, which filling length is smaller than the distance between the front edge and the rear edge of the mould cavity opening, viewed in the direction of the movement path.

Preferably, the control unit is configured in this case to control the pump on the basis of the position-determining device during movement of the mould cavity opening of the mould cavity and the dispensing mouth of the filling device with respect to each other in such a manner that the pump essentially does not transfer any foodstuff from the dispensing mouth into the mould cavity when the front edge of the mould cavity opening moves from a position in which the front edge is aligned with respect to the front edge of the dispensing mouth and the mould cavity opening meets/touches the dispensing mouth and/or starts to partly overlap it up to a mutual initial filling position of the mould cavity opening and the dispensing mouth in which the front edge of the mould cavity opening has been moved beyond the front edge of the dispensing mouth over a predetermined distance which is input into the control unit and the mould cavity opening and the dispensing mouth partly overlap each other, and the pump displaces a volume of the foodstuff from the dispensing mouth into the mould cavity which substantially corresponds to the volume of the mould cavity after the mutual initial filling position has been reached.

In an embodiment, the mould member comprises a moulding roller which is rotatable about an axis of rotation, preferably a horizontal axis of rotation, wherein the moulding roller has a moulding roller peripheral wall which defines the moulding surface, and wherein the movement path is determined by the direction of rotation of the moulding roller about the axis of rotation. Each mould cavity may comprise a bottom and a peripheral wall, wherein the peripheral wall extends from the bottom and defines the mould cavity opening. Several mould cavities, for example rows of mould cavities, may be provided in the moulding roller. The rows of mould cavities may, for example, extend in the axial direction (width direction) of the moulding roller or according to a helix or in yet another way, for example, in a pattern in which adjacent recesses are offset in the peripheral direction of the moulding roller. The position and dimensions of the mould cavities are input into the control unit and/or the position-determining device.

The mould cavity opening of the mould cavity may have different shapes. For example, the mould cavity opening of the mould cavity may have a substantially round shape. It is also possible for the mould cavity opening of the mould cavity to have a substantially oval shape, wherein the mould cavity opening has a length which extends in the direction of the movement path between the front edge and the rear edge of the mould cavity opening, and wherein the mould cavity opening has a width which extends in a direction transverse to the movement path, and wherein the length of the mould cavity opening is unequal to the width of the mould cavity opening. The length of the mould cavity opening is, for example, at most 20% or at most 10% greater or smaller than the width of the mould cavity opening. Using such shapes of the mould cavity, it is possible to produce uniform, substantially round shapes of the food products after cooking by setting the correct mutual initial filling position and/or filling length. Furthermore, it is possible for the mould cavity to be designed to mould a food product in the shape of, for example, a chicken nugget or drumstick.

The invention also relates to a method for moulding three-dimensional products from a mass of foodstuff which can be pumped, for example a meat mass, comprising:

moving a mould cavity opening of at least one mould cavity of a mould member and a dispensing mouth of a filling device with respect to each other along a movement path by a drive device, wherein the mould member has a moulding surface in which the mould cavity for moulding the products from the foodstuff is provided, which mould cavity is provided with the mould cavity opening on the moulding surface, and wherein the filling device is configured to fill the mould cavity of the mould member with the foodstuff, which filling device is provided with the dispensing mouth, and a pump for displacing a volume of the foodstuff from the dispensing mouth, and wherein the dispensing mouth and the mould cavity opening each, viewed in the direction of the movement path, comprise a front edge and a rear edge which is situated at a fixed distance thereof, and in which the distance between the front edge and the rear edge of the dispensing mouth in said direction is smaller than the distance between the front edge and the rear edge of the mould cavity opening in said direction, determining and/or detecting, by means of a position-determining device, for example a position sensor, the position of the front edge of the mould cavity opening of the mould cavity with respect to the front edge of the dispensing mouth of the filling device during the movement of the mould cavity opening of the mould cavity and the dispensing mouth of the filling device with respect to each other, and inputting a predetermined filling length into a control unit, controlling the pump by means of the control unit in such a manner on the basis of the position-determining device during the movement of the mould cavity opening of the mould cavity and the dispensing mouth of the filling device with respect to each other that the pump displaces a volume of the foodstuff which substantially corresponds to the volume of the mould cavity from the dispensing mouth into the mould cavity, while the front edge of the mould cavity opening and the front edge of the dispensing mouth, viewed in the direction of the movement path, move with respect to each other across the predetermined filling length which has been input into the control unit, which filling length is smaller than the distance, viewed in the direction of the movement path, between the front edge and the rear edge of the mould cavity opening.

In this case, it is possible that a predetermined distance is input into the control unit, wherein the pump is controlled by means of the control unit on the basis of the position-determining device during the movement of the mould cavity opening of the mould cavity and the dispensing mouth of the filling device with respect to each other in such a manner that the pump essentially does not transfer any foodstuff from the dispensing mouth into the mould cavity from a mutual position of the mould cavity opening and the dispensing mouth in which the front edge of the mould cavity opening and the front edge of the dispensing mouth are aligned with respect to each other and the mould cavity opening and the dispensing mouth meet/touch each other and/or start to partly overlap each other up to a mutual initial filling position of the mould cavity opening and the dispensing mouth in which the front edge of the mould cavity opening and the front edge of the dispensing mouth have been moved past each other over the predetermined distance which has been input into the control unit and the mould cavity opening and the dispensing mouth partly overlap each other, and the pump displaces the volume of the foodstuff which substantially corresponds to the volume of the mould cavity from the dispensing mouth into the mould cavity after the mutual initial filling position has been reached.

In this case, it is also possible to input a predetermined pressure into the control unit, wherein the moulding device is provided with a pressure sensor for detecting the pressure of the foodstuff in the mould cavity, and wherein the pump is controlled on the basis of the position-determining device and the pressure sensor during the movement of the mould cavity opening of the mould cavity and the dispensing mouth of the filling device with respect to each other in such a manner that, after the front edge of the mould cavity opening and the front edge of the dispensing mouth have been moved with respect to each other across the filling length and the pump has displaces the volume of the foodstuff which substantially corresponds to the volume of the mould cavity from the dispensing mouth into the mould cavity, the pump brings the foodstuff which is situated in the mould cavity to the predetermined pressure which has been input into the control unit.

The control unit comprises, for example, a display and an input device for inputting the predetermined filling length and/or the volume of the foodstuff to be transferred by pumping (volume of the mould cavity) and/or the predetermined distance (starting position) and/or the predetermined pressure. The control unit may also be provided with a memory for storing the predetermined filling length and/or the volume of the foodstuff to be transferred by pumping (volume of the mould cavity) and/or the predetermined distance (starting position) and/or the predetermined pressure.

The invention will now be explained with reference to an exemplary embodiment illustrated in the figures.

DETAILED DESCRIPTION OF EMBODIMENTS

Figure 1:
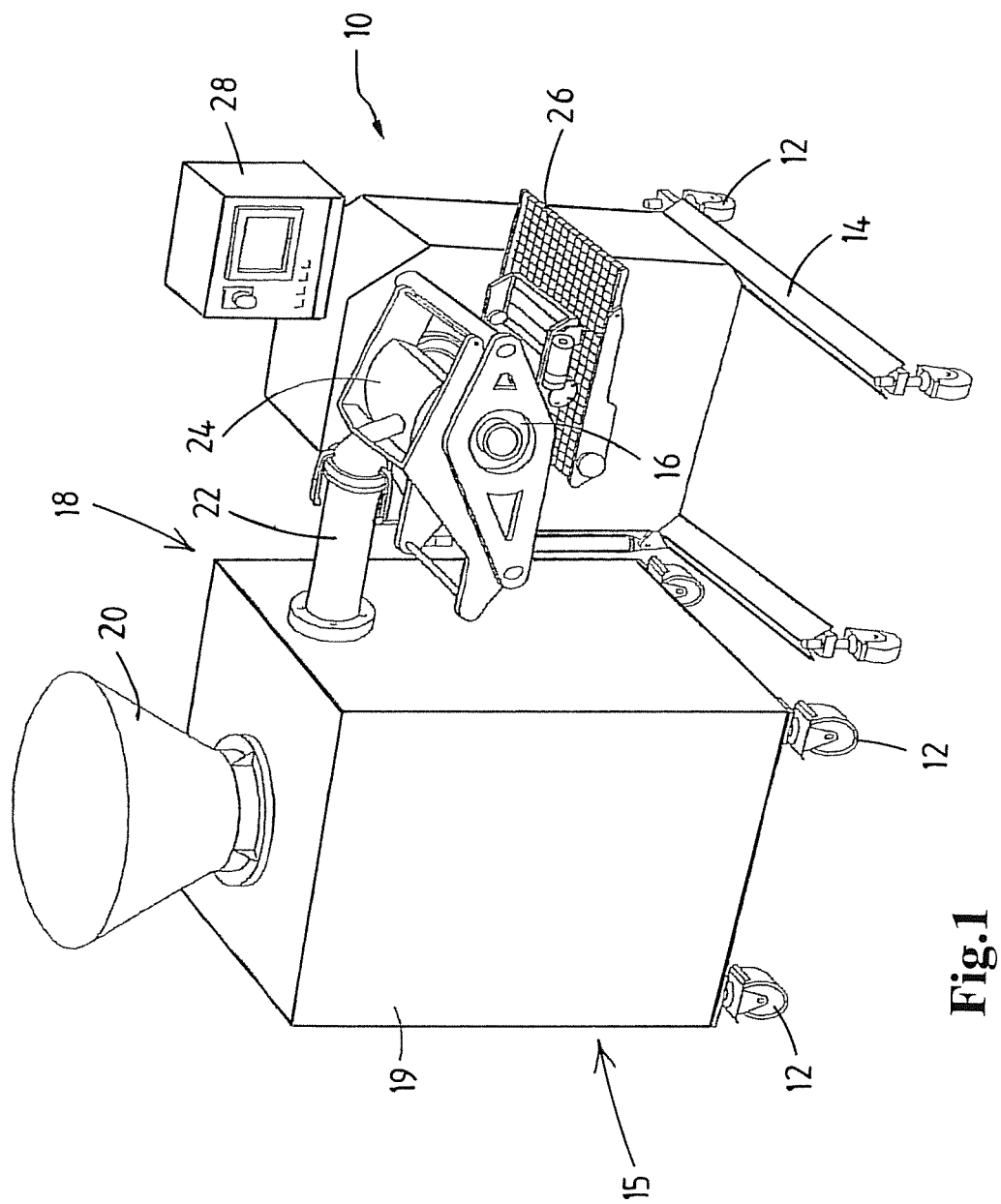
FIG. 1 diagrammatically shows a perspective view of an embodiment of a moulding device according to the invention.

FIG. 1 shows an exemplary embodiment of a moulding device 10 for moulding products from a mass of foodstuff which can be pumped and is suitable for consumption, for example a meat mass. The moulding device 10 comprises a mould member 16, a filling device 18 and a discharge device 26.

In this exemplary embodiment, the mould member 16 is designed as a moulding roller which is rotatable about a substantially horizontal axis of rotation. The moulding roller 16 is rotatably suspended from a mobile frame 14 having wheels 12. The moulding roller 16 can be rotatably driven by a drive device, such as an electric motor (not shown). The outer peripheral surface of the moulding roller 16 forms a moulding surface 45 which contains several mould cavities 44 (see FIG. 2).

The mould cavities 44 are designed to mould products from the mass of foodstuff. The shape of the mould cavities 44 corresponds to the shape of the product to be moulded. Each mould cavity 44 comprises a bottom 47 and a peripheral wall 48 which extends from the bottom 47 to the moulding surface 45. The peripheral edge of the peripheral wall 48 on the moulding surface 45 defines a mould cavity opening 46 of the mould cavity 44. The dimensions of the bottom 47 and the peripheral wall 48 of each mould cavity 44 determine the volume of said mould cavity 44. The volume of each mould cavity 44 is fixed and, for example, equal to the volume of the other mould cavities 44.

Figure 2:
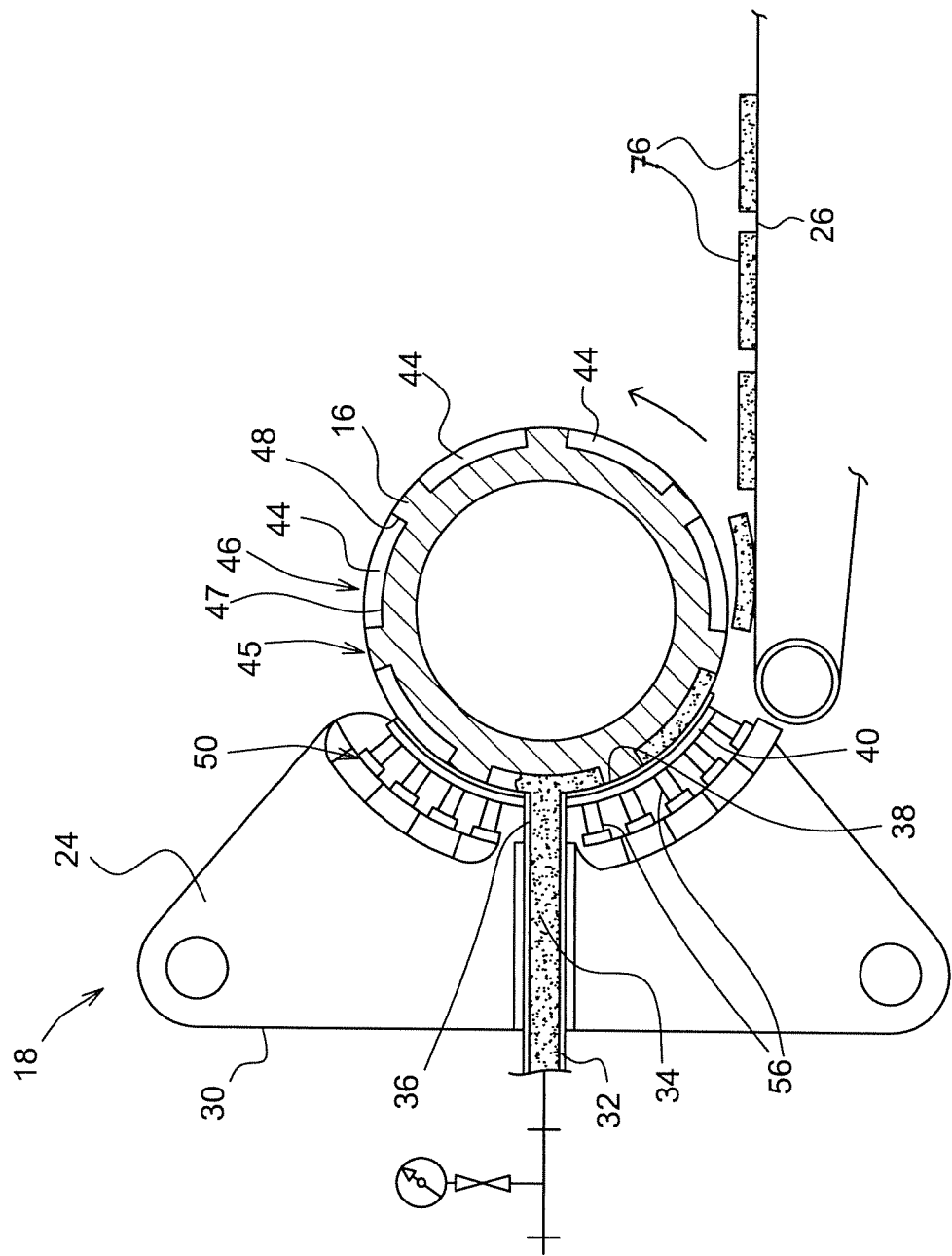
FIG. 2 diagrammatically shows a cross-sectional view of a filling shoe of the filling device and the mould member of the moulding device illustrated in FIG. 1.

The mould cavities 44 may be distributed across the moulding roller in different ways. As illustrated in FIG. 2, the mould cavities 44 are spaced apart in the peripheral direction of the moulding roller 16. In addition, the mould cavities 44 are arranged in rows next to one another, for example in the axial direction of the moulding roller 16, in the moulding surface 45. However, the mould cavities 44 can also be distributed across the moulding surface 45 according to a helix or in a different manner.

The filling device 18 is configured to fill the mould cavities 44 of the moulding roller 16. The filling device 18 divides the mass of foodstuff across the mould cavities 44 of the moulding roller 16. In this exemplary embodiment, the filling device 18 comprises a mobile frame 15 having wheels 12, which comprises a storage container 19, an introduction funnel 20 and a pump (not shown). The pump is, for example, a so-called "positive displacement pump", such as a vane pump or a screw pump. The storage container 19 comprises a discharge which is connected to a filling shoe 24 of the filling device 18 by means of a detachable connecting pipe 22.

FIG. 2 diagrammatically shows a cross section of the moulding roller 16 and the filling shoe 24 of the filling device 18. The filling shoe 24 comprises a housing 30 with an inlet 32 for the mass of foodstuff. The inlet 32 is connected to the storage container 19 via the connecting pipe 22 (see FIG. 1). The filling shoe 24 comprises a passage 34, which extends from the inlet 32 to a dispensing mouth 36.

The dispensing mouth 36 faces the moulding roller 16, that is to say the dispensing mouth 36 faces the mould cavities 44 of the moulding roller 16. The dispensing mouth 36 is arranged in an abutment surface 38 of the filling shoe 24, which can sealingly adjoin the moulding surface 45 of the moulding roller 16. The dispensing mouth 36 is, for example, arranged in a flexible connecting plate 40 by means of which the filling shoe 24 sealingly adjoins the moulding surface 45 of the moulding roller 16 during the filling process.

In cross section, the connecting plate 40 essentially has the shape of a segment of a circle, the diameter of which corresponds to the diameter of the moulding surface 45 of the moulding roller 16. The flexible connecting plate 40 may be pressed against the moulding surface 45 of the moulding roller 16 by means of actuating means 50, 56 at an adjustable pressure. However, the sealing between the abutment surface 38 of the filling shoe 24 and the moulding surface 45 of the moulding roller 16 may also be designed differently.

In this exemplary embodiment, the dispensing mouth 36 is slot-shaped. The passage 34 widens from the inlet 32 to the slot-shaped dispensing mouth 36. The slot-shaped dispensing mouth 36 extends across virtually the entire width (in the axial direction) of the moulding roller 16. If the mould cavities 44 are arranged next to one another in rows in the width direction in the moulding surface 45 of the moulding roller 16, the slot-shaped dispensing mouth 36 can fill the mould cavities 44 of one row simultaneously.

The operation of the moulding device 10 is as follows. The mass of foodstuff to be moulded which can be pumped is supplied to the storage container 19 via the introduction funnel 20. The pump which operates, for example (semi)

continuously, has an adjustable volumetric flow (volume per unit time). The pump transfers a controlled volume of mass of foodstuff to be moulded via the connecting pipe 22 to the inlet 32 of the filling shoe 24.

From the inlet 32, the foodstuff is transferred to the dispensing mouth 36 via the passage 34 due to the action of the pump. The controlled volume of the mass of foodstuff flows from the dispensing mouth 36 into a mould cavity 44 if said mould cavity 44 is in communication with the dispensing mouth 36, that is to say when said mould cavity 44 passes the dispensing mouth 36 during driving of the moulding roller 16. As a result thereof, the mould cavity 44 is filled and a moulded product 76 is moulded in said mould cavity 44.

The products 76 moulded in the mould cavities 44 are then released from the mould cavities 44 and placed on the discharge device 26 and discharged. The discharge device 26 comprises a conveying device which is fitted under the moulding roller 16, for example an endless conveyor belt. By means of the conveying device, the products can then be moved to, for example, one or more processing stations, such as a protein-coating device, a breadcrumb-coating device, a freezing device and/or a packaging device.

The filling of the mould cavity 44 of the moulding roller 16 with the mass of foodstuff to be moulded according to the invention is diagrammatically shown in FIGS. 3a-e and will be explained in more detail below. Although only the filling of a single mould cavity will be described, it is obviously possible to fill several mould cavities in a row simultaneously.

Figure 3A:
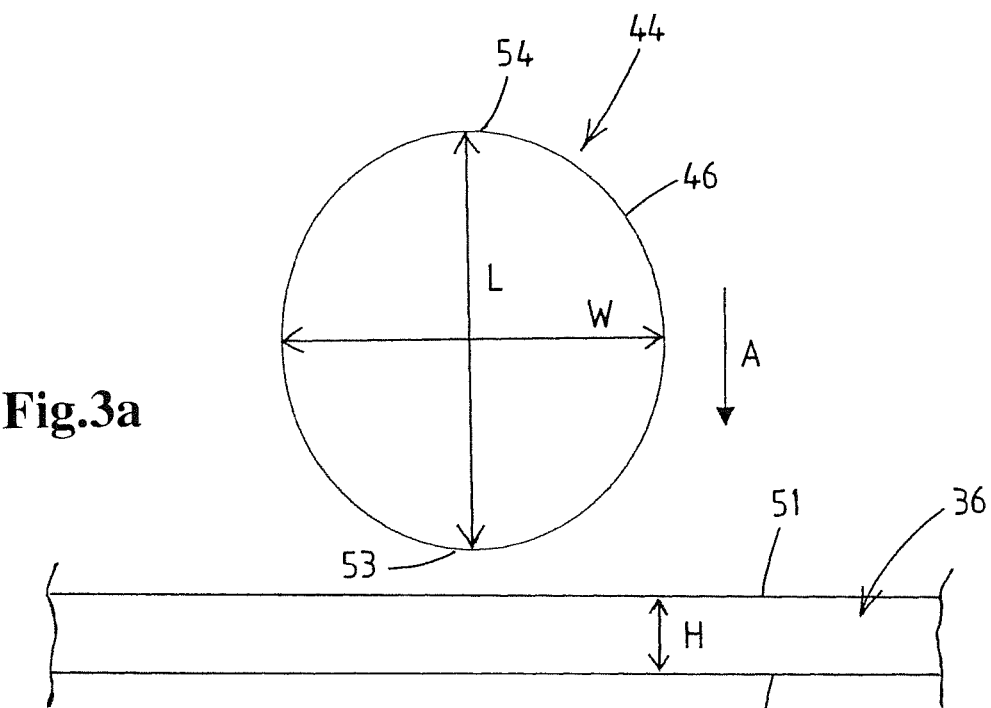
FIGS. 3a, 3b, 3c, 3d, 3e diagrammatically show the position of the mould cavity opening of a mould cavity with respect to the dispensing mouth of the filling device for filling said mould cavity.

As a result of the drive device rotating the moulding roller 16 about the horizontal axis of rotation, the mould cavity 44 of the moulding roller 16 illustrated in FIG. 3a can be moved along a movement path with respect to the dispensing mouth 36 of the filling device 18. In this exemplary embodiment, the movement path A runs in the peripheral direction of the moulding roller 16. The movement path is indicated in FIGS. 3a-e by an arrow A.

Viewed in the direction of the movement path A, the dispensing mouth 36 of the filling shoe 24 comprises a front edge 51 and a rear edge 52 which is situated at a fixed distance from the front edge 51. The fixed distance between the front edge 51 and the rear edge 52 of the dispensing mouth 36 is indicated by the letter H. The distance H is, for example, 5-50 mm, e.g. approximately 10 mm, 20 mm or 40 mm.

Viewed in the direction of the movement path A, the mould cavity opening 46 of the mould cavity 44 also comprises a front edge 53 and a rear edge 54 which is situated at a fixed distance thereof. The fixed distance between the front edge 53 and the rear edge 54 of the mould cavity opening 46 is denoted by the letter L. The distance L is the length of the mould cavity opening 46.

Viewed in the direction of the movement path A, the distance H between the front edge 51 and the rear edge 52 of the dispensing mouth 36 is smaller than the length L of the mould cavity opening 46 (see FIGS. 3a-e). While the mould cavity opening 46 passes the dispensing mouth 36, a portion of the mould cavity opening 46 extends next to the dispensing mouth 36. During filling, the dispensing mouth 36 therefore opens locally into the mould cavity opening 46, that is to say, during filling, the dispensing mouth 36 covers only a portion of the total surface area of the mould cavity opening 46.

The mould cavity opening 46 has a width W which extends in a direction transverse to the movement path A. In this exemplary embodiment, the mould cavity opening 46 has a substantially oval shape, with the width W being smaller than the length L of the mould cavity opening 46. Incidentally, the mould cavity opening 46 may, for example, also have a substantially oval shape, with the width W being larger than the length L of the mould cavity opening (not shown). The difference between the length L and the width W of the mould cavity opening 46 may be relatively small, so that the mould cavity opening 46 is visually substantially round. In addition, it is possible for the mould cavity opening 46 to have a different shape.

The dimensions of the mould cavity 44 depend on the desired product to be moulded. The mould cavity 44 may have different dimensions. In order to mould hamburgers, the mould cavity 44 has a depth of, for example, 3-15 mm, such as approximately 5 mm, a length L of 90-120 mm, such as approximately 110 mm, and a width W of 80-100 mm, such as approximately 95 mm.

Before the mould cavity 44 is filled, the front edges 51, 53 of the dispensing mouth 36 and the mould cavity opening 46, respectively, are situated at a distance from each other (see FIG. 3a). As a result of the moulding roller 16 being driven, the front edge 53 of the mould cavity opening 46 moves towards the front edge 51 of the dispensing mouth 36. At this stage, the dispensing mouth 36 is sealed by the sealing between the flexible connecting plate 40 of the filling shoe 24 and the moulding surface 45 of the moulding roller 16. Thus, no foodstuffs flow out of the dispensing mouth 36.

The moulding device 10 according to the invention comprises a position-determining device, for example a position sensor (not shown) for determining and/or detecting the position of the front edge 53 of the mould cavity opening 46 with respect to the front edge 51 of the dispensing mouth 36 during the movement of the mould cavity opening 46 with respect to the dispensing mouth 36. While the dispensing mouth 36 is situated in a fixed position which is known, the position sensor, for example, emits a signal when it detects a change in the material which moves past the position sensor, that is to say the moulding surface or the mould cavity opening. From this signal, it is possible to calculate, in combination with the geometric data of the moulding device, the position of the front edge 53 of the mould cavity opening 46 with respect to the front edge 51 of the dispensing mouth 36. However, the position-determining device may also be designed differently.

In addition, the moulding device 10 comprises a control unit 28 (see FIG. 1) which is connected to the position-determining device and the pump. The volume of the mass of foodstuff which can be pumped and which is dispensed by the pump per unit time from the dispensing mouth 36 can be controlled by the control unit 28 on the basis of the position-determining device during the movement of the mould cavity opening 46 with respect to the dispensing mouth 36. The control unit 28 controls the volumetric flow of the pump. The volume which is dispensed for each mould cavity by the pump is in this case substantially equal to the volume of the mould cavity.

Figure 3B:
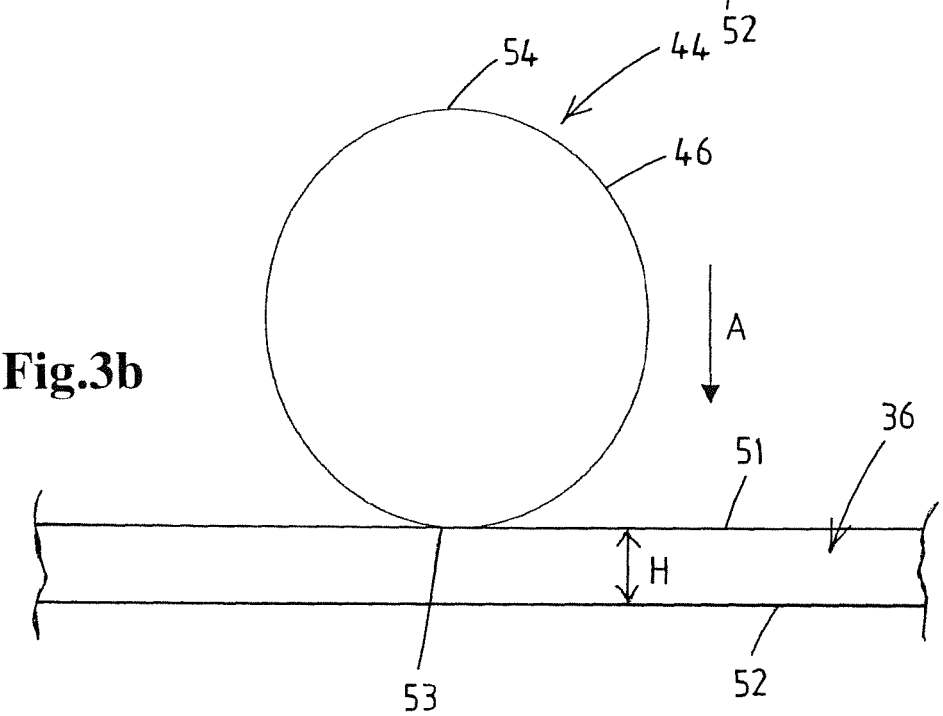

FIG. 3b shows that the front edge 53 of the mould cavity opening 46 is aligned with respect to the front edge 51 of the dispensing mouth 36. The mould cavity opening 46 and the dispensing mouth 36 touch each other and start to partly overlap. In the prior art, foodstuff flows from the dispensing mouth 36 in the mould cavity 44 immediately following the mutual position of the mould cavity opening 46 and the dispensing mouth 36 illustrated in FIG. 3b.

By contrast, according to this exemplary embodiment the pump is controlled by the control unit 28 in such a way that substantially no foodstuff is moved from the dispensing mouth 36 in the mould cavity 44 until a mutual initial filling position of the mould cavity opening 46 and the dispensing mouth 36 has been reached. The desired mutual initial filling position is determined prior to the filling process and input into the control unit 28 by means of a predetermined distance $p_0$.

In the mutual initial filling position, the front edge 53 of the mould cavity opening 44 has been moved beyond the front edge 51 of the dispensing mouth 36 over said predetermined distance $p_0$ which has been input into the control unit 28. For example, the front edge 53 of the mould cavity opening 46 is situated in the mutual initial filling position between the front edge 51 and the rear edge 52 of the dispensing mouth 36 (see FIG. 3c). The mould cavity opening 46 and the dispensing mouth 36 then at least partly overlap each other. The predetermined distance $p_0$ is for example 5-20 mm.

Incidentally, according to the invention, it is also possible for the predetermined distance $p_0$ to be equal to 0 (not shown). This depends on, for example, the shape and dimensions of the mould cavity. The optimum starting position may, for example, also depend on the compressibility of the foodstuff and the flexibility of the moulding device. If the predetermined distance $p_0$ is equal to 0, foodstuff flows from the dispensing mouth 36 in the mould cavity 44, in a way similar to the prior art, immediately following the mutual position of the mould cavity opening 46 and the dispensing mouth 36 illustrated in FIG. 3b.

By controlling the control unit 28, the pump, from the mutual initial filling position which is determined by the predetermined distance $p_0$ ($\geq 0$), displaces a volume of the mass of foodstuff from the dispensing mouth 36 into the mould cavity 44 which substantially corresponds to the volume of the mould cavity 44. This volume is pumped into the mould cavity 44, while the mould cavity 44 moves over a desired filling length $p_1$, viewed in the direction of the movement path A, which is determined prior to the filling process and is input into the control unit 28. On the basis of the input desired filling length $p_1$ and the speed of displacement of the mould cavity 44, the control unit 28 determines the associated volumetric flow of the mass of foodstuff.

Figure 3C:
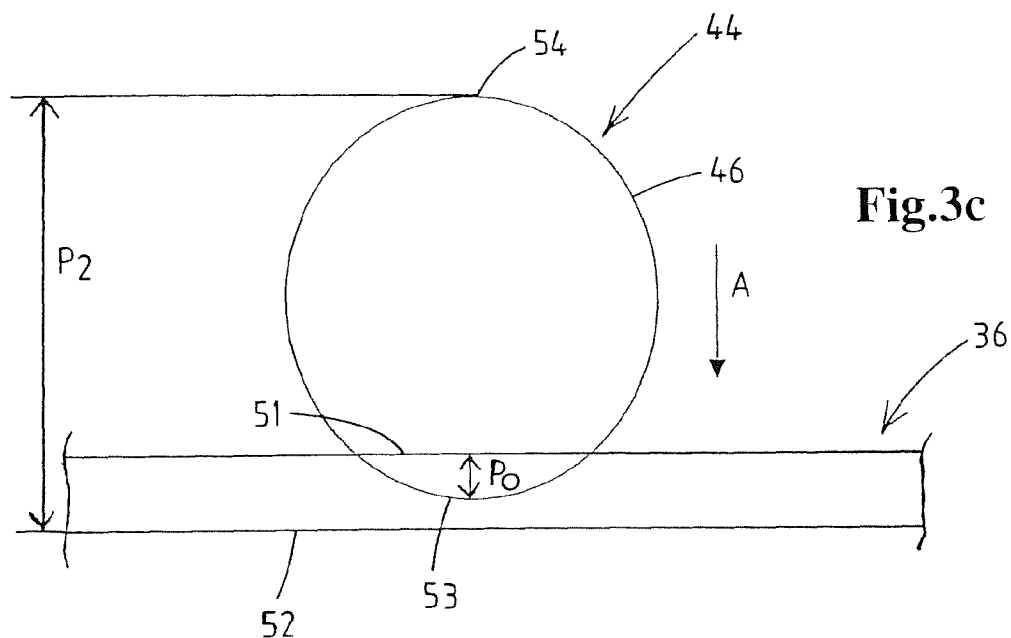
Figure 3D:
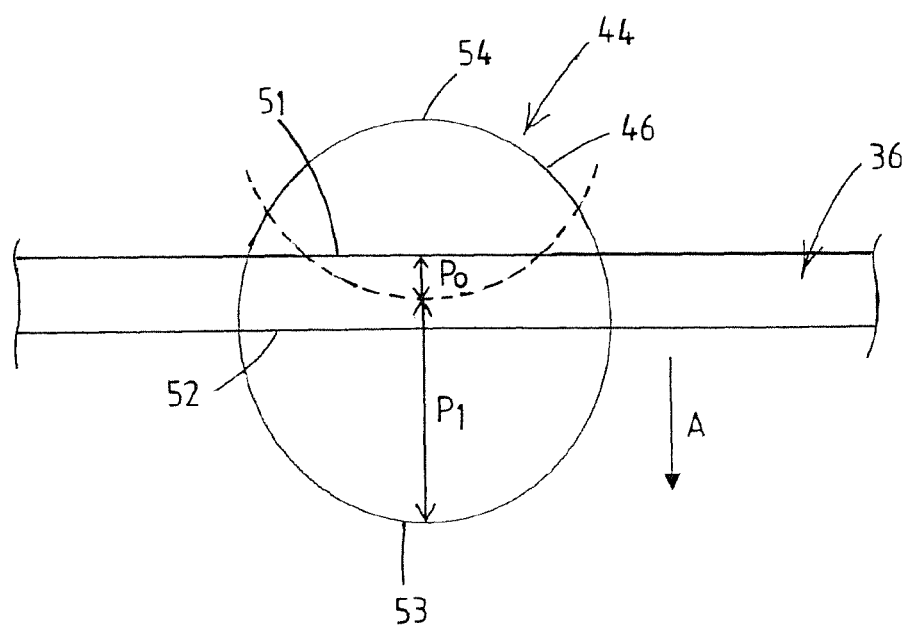
Figure 3E:
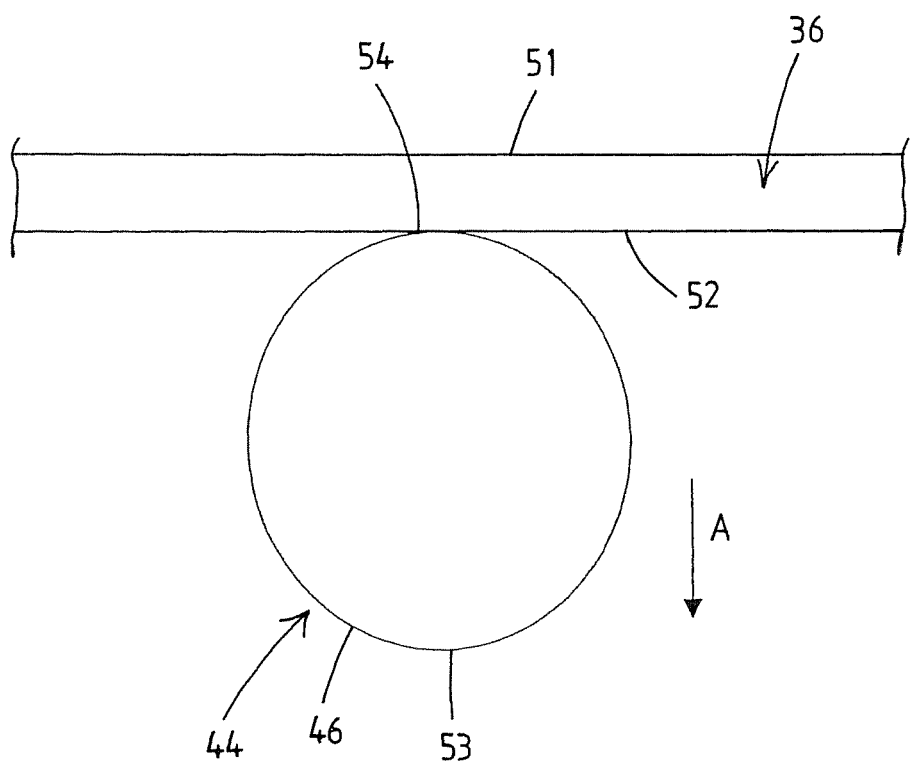

In other words, the control unit 28 controls the pump in such a manner that the volume of the mass of foodstuff to substantially completely fill the mould cavity 44 is displaced by the pump from the dispensing mouth 36 into the mould cavity 44, while the front edge 53 of the mould cavity opening 44, viewed in the direction of the movement path A, moves from the mutual initial filling position as illustrated in FIG. 3c, over said predetermined filling length $p_1$ which has been input into the control unit 28, with respect to the front edge 51 of the dispensing mouth 36 (see FIG. 3d). Incidentally, the volumetric flow during filling may be substantially constant or vary.

The filling length $p_1$ is smaller than the distance between the front edge 53 and the rear edge 54 of the mould cavity opening 44, viewed in the direction of the movement path A. The filling length $p_1$ is also smaller than the distance $p_2-p_0$, in which the distance $p_2$ is determined by the distance, viewed in the direction of the movement path A, between the rear edge 52 of the dispensing mouth 36 and the rear edge 54 of the mould cavity opening 44 in the mutual initial filling position as illustrated in FIG. 3c. The mould cavity 44 is thus completely filled before the rear edge 54 of the mould cavity opening 44 moves past the rear edge 52 of the dispensing mouth 36.

Incidentally, the filling length $p_1$ is preferably smaller than the distance, viewed in the direction of the movement path A, between the front edge 51 of the dispensing mouth 36 and the rear edge 54 of the mould cavity opening 44 in the mutual initial filling position as illustrated in FIG. 3c. Then, the mould cavity 44 is already completely filled while the dispensing mouth 36 is still in communication with the mould cavity 44 along the entire distance H.

The filling length $p_1$ is preferably 5-30 mm, such as approximately 10-20 mm. With such a relatively short filling length $p_1$, it is possible to influence the pressure in the mould cavity 44 by controlling the pump after filling. To this end, the moulding device 10 in this exemplary embodiment comprises a pressure sensor for detecting the pressure of the foodstuff in the mould cavity 44 and/or the dispensing mouth (not shown). Prior to the filling process, a desired pressure of the foodstuff in the filled mould cavity 44 is determined and input into the control unit 28.

The control unit 28 controls the pump on the basis of the position-determining device and the pressure sensor in such a manner that said predetermined pressure which has been input into the control unit 28 is reached in the mould cavity 44. In other words, after the front edge 53 of the mould cavity opening 46 has been moved with respect to the front edge 51 of the dispensing mouth 36 over the relatively short filling length $p_1$ and the mould cavity 44 has been filled substantially completely, the pump brings the foodstuff in the mould cavity 44 to the desired pressure.

The pump can influence the pressure in the mould cavity 44 until the rear edge 54 of the mould cavity opening 44 moves past the rear edge 52 of the dispensing mouth 36 (see FIG. 3e), since thereafter, there is no longer any connection between the dispensing mouth 36 and the mould cavity opening 46 and the dispensing mouth 36 and the mould cavity 44 are again sealed with respect to each other by the sealing connection between the flexible connecting plate 40 and the moulding surface 45 of the moulding roller 44.

The invention is not limited to the above-described exemplary embodiment. A person skilled in the art can make various modifications which are within the scope of the invention. Filling the mould cavity as described above may, for example, also be used with a mould member which comprises mould plates which can be moved to and fro with respect to one another in a straight line.

According to a second aspect, the invention relates to a moulding device for moulding three-dimensional products from a mass of foodstuff which can be pumped, for example a meat mass, comprising:
  a mould member having a moulding surface in which at least one mould cavity for moulding the products from the foodstuff is arranged, which mould cavity is provided with a mould cavity opening at the moulding surface,
  a filling device for filling the mould cavity of the mould member with the foodstuff, which filling device is provided with a dispensing mouth, and a pump for displacing a volume of the foodstuff from the dispensing mouth,
wherein the mould cavity opening of the mould cavity of the mould member and the dispensing mouth of the filling device can be moved with respect to one another along a movement path by a drive device, and wherein the dispensing mouth and the mould cavity opening each, viewed in the direction of the movement path, comprise a front edge and a rear edge which is situated at a fixed distance thereof, and wherein the distance between the front edge and the rear edge of the dispensing mouth in said direction is smaller than the distance between the front edge and the rear edge of the mould cavity opening in said direction, characterized in that the moulding device is provided with:
- a position-determining device, for example a position sensor, for determining and/or detecting the position of the front edge of the mould cavity opening of the mould cavity with respect to the front edge of the dispensing mouth of the filling device during movement of the mould cavity opening of the mould cavity and the dispensing mouth of the filling device with respect to one another, and
- a control unit which is connected to the position-determining device and to the pump, which control unit is configured to control the pump on the basis of the position-determining device during the movement of the mould cavity opening of the mould cavity and the dispensing mouth of the filling device with respect to one another such that the pump substantially does not transfer any foodstuff from the dispensing mouth into the mould cavity from a mutual position of the mould cavity opening and the dispensing mouth in which the front edge of the mould cavity opening and the front edge of the dispensing mouth are aligned with respect to each other and the mould cavity opening and the dispensing mouth meet/touch each other and/or start to partly overlap each other up to a mutual initial filling position of the mould cavity opening and the dispensing mouth in which the front edge of the mould cavity opening and the front edge of the dispensing mouth have been moved past each other over a predetermined distance which has been input into the control unit and the mould cavity opening and the dispensing mouth partly overlap each other, and the pump displaces a volume of the foodstuff from the dispensing mouth into the mould cavity which substantially corresponds to the volume of the mould cavity after the mutual initial filling position has been reached.

According to this second aspect, it is possible for the control unit to be configured to control the pump on the basis of the position-determining device during the movement of the mould cavity opening of the mould cavity and the dispensing mouth of the filling device with respect to each other in such a manner that the pump displaces the volume of the foodstuff which substantially corresponds to the volume of the mould cavity from the dispensing mouth into the mould cavity while the front edge of the mould cavity opening and the front edge of the dispensing mouth move with respect to each other from the mutual initial filling position, viewed in the direction of the movement path, over a predetermined filling length which has been input into the control unit, which filling length is smaller than the distance, viewed in the direction of the movement path, between the rear edge of the dispensing mouth and the rear edge of the mould cavity opening in the mutual initial filling position.

According to the second aspect, the moulding device may comprise a pressure sensor for detecting the pressure of the foodstuff in the mould cavity, in which the control unit is configured to control the pump on the basis of the position-determining device and the pressure sensor during the movement of the mould cavity opening of the mould cavity and the dispensing mouth of the filling device with respect to each other in such a manner that, after the front edge of the mould cavity opening and the front edge of the dispensing mouth have been moved with respect to each other over the filling length and the pump has displaced the volume of foodstuff which substantially corresponds to the volume of the mould cavity from the dispensing mouth into the mould cavity, the pump brings the foodstuff which is situated in the mould cavity to a predetermined pressure which has been input into the control unit.

The moulding device according to the second aspect can be combined with one or more of the features according to one or more of claims 4-11 and/or with one or more of the features from the above description. The invention according to the second aspect also relates to a method for moulding three-dimensional products from a mass of foodstuff which can be pumped, for example a meat mass, comprising:
- moving a mould cavity opening of at least one mould cavity of a mould member and a dispensing mouth of a filling device with respect to each other along a movement path by a drive device, wherein the mould member has a moulding surface in which the mould cavity for moulding the products from the foodstuff is provided, which mould cavity is provided with the mould cavity opening on the moulding surface, and in which the filling device is configured to fill the mould cavity of the mould member with the foodstuff, which filling device is provided with the dispensing mouth, and a pump for displacing a volume of the foodstuff from the dispensing mouth, and in which the dispensing mouth and the mould cavity opening each, viewed in the direction of the movement path, comprise a front edge and a rear edge which is situated at a fixed distance thereof, and in which the distance between the front edge and the rear edge of the dispensing mouth in said direction is smaller than the distance between the front edge and the rear edge of the mould cavity opening in said direction,
- determining and/or detecting, by means of a position-determining device, for example a position sensor, the position of the front edge of the mould cavity opening of the mould cavity with respect to the front edge of the dispensing mouth of the filling device during the movement of the mould cavity opening of the mould cavity and the dispensing mouth of the filling device with respect to each other, and
- inputting a predetermined distance into a control unit,
- controlling the pump by means of the control unit in such a manner on the basis of the position-determining device during the movement of the mould cavity opening of the mould cavity and the dispensing mouth of the filling device with respect to each other that the pump substantially does not transfer any foodstuff from the dispensing mouth into the mould cavity from a mutual position of the mould cavity opening and the dispensing mouth in which the front edge of the mould cavity opening and the front edge of the dispensing mouth are aligned with respect to each other and the mould cavity opening and the dispensing mouth meet/touch each other and/or start to partly overlap each other up to a mutual initial filling position of the mould cavity opening and the dispensing mouth in which the front edge of the mould cavity opening and the front edge of the dispensing mouth have been moved past each other over the predetermined distance which has been input into the control unit and the mould cavity opening and the dispensing mouth partly overlap each other, and the pump displaces a volume of the foodstuff from the dispensing mouth into the mould cavity which substantially corresponds to the volume of the mould cavity after the mutual initial filling position has been reached.

With the method according to this second aspect, it is possible for a predetermined filling length to be input into the control unit, and wherein the pump is controlled by means of the control unit on the basis of the position-determining device during the movement of the mould cavity opening of the mould cavity and the dispensing mouth of the filling device with respect to each other in such a manner that the pump displaces the volume of the foodstuff which substantially corresponds to the volume of the mould cavity from the dispensing mouth into the mould cavity while the front edge of the mould cavity opening and the front edge of the dispensing mouth move with respect to each other from the mutual initial filling position, viewed in the direction of the movement path, over the predetermined filling length which has been input into the control unit, which filling length is smaller than the distance, viewed in the direction of the movement path, between the rear edge of the dispensing mouth and the rear edge of the mould cavity opening in the mutual initial filling position.

With the method according to this second aspect, it is also possible to input a predetermined pressure into the control unit, wherein the moulding device is provided with a pressure sensor for detecting the pressure of the foodstuff in the mould cavity, and wherein the pump is controlled on the basis of the position-determining device and the pressure sensor during the movement of the mould cavity opening of the mould cavity and the dispensing mouth of the filling device with respect to each other in such a manner that, after the front edge of the mould cavity opening and the front edge of the dispensing mouth have been moved with respect to each other over the filling length and the pump has displaced the volume of foodstuff which substantially corresponds to the volume of the mould cavity from the dispensing mouth into the mould cavity, the pump brings the foodstuff which is situated in the mould cavity to the predetermined pressure which has been input into the control unit.

The features from this description can be applied separately and/or in any desired combination with one or more of the features according to one or more of the claims.

The invention claimed is:

1. A moulding device for moulding three-dimensional products from a pumpable mass of foodstuff, comprising:
a mould member having a moulding surface in which at least one mould cavity for moulding the products from a mass of foodstuff is arranged, which said at least one mould cavity is provided with a mould cavity opening at the moulding surface and which said at least one mould cavity has a volume,
a filling device for filling the at least one mould cavity of the mould member with the mass of foodstuff, which filling device is provided with a dispensing mouth, and with a pump for displacing a volume of the mass of foodstuff from the dispensing mouth, wherein the mould cavity opening of the at least one mould cavity of the mould member and the dispensing mouth of the filling device are movable with respect to one another along a movement path,
a drive device to move the mould cavity opening of the at least one mould cavity of the mould member and the dispensing mouth of the filling device with respect to one another along said movement path,
wherein the dispensing mouth and the mould cavity opening each, viewed in a direction of said movement path, comprise a front edge and a rear edge which is situated at a fixed distance thereof, and wherein a distance between the front edge and the rear edge of the dispensing mouth in said direction of said movement path is smaller than a distance between the front edge and the rear edge of the mould cavity opening in said direction of said movement path, and wherein the moulding device further comprises:
a position-determining device for determining a position of the front edge of the mould cavity opening of the at least one mould cavity with respect to the front edge of the dispensing mouth of the filling device during movement of the mould cavity opening of the at least one mould cavity and the dispensing mouth of the filling device with respect to one another, and
a control unit which is connected to the position-determining device and to the pump, which said control unit being configured to control the pump: (i) based on the position-determining device; (ii) during the movement of the mould cavity opening of the at least one mould cavity and the dispensing mouth of the filling device with respect to one another; (iii) in such a manner that the pump begins displacing a volume of the foodstuff, which substantially corresponds to the volume of the at least one mould cavity, from the dispensing mouth into the at least one mould cavity when the front edge of the mould cavity opening and the front edge of the dispensing mouth, viewed in the direction of said movement path, have moved past each other over a predetermined distance stored by the control unit such that the mould cavity opening and the dispensing mouth partly overlap each other at a mutual initial filling position; and (iv) in such a manner that the pump stops displacing foodstuff from the dispensing mouth and into the at least one mould cavity when the front edge of the mould cavity opening and the front edge of the dispensing mouth, viewed in the direction of said movement path, have moved with respect to each other over a predetermined filling length stored by the control unit, wherein the predetermined filling length is smaller than the distance between the front edge and the rear edge of the mould cavity opening, viewed in the direction of said movement path.

2. Moulding device according to claim 1, wherein the moulding device further comprises a pressure sensor for detecting a pressure of the mass of the foodstuff in at least one of the at least one mould cavity and the dispensing mouth, and wherein the control unit is configured to control the pump on the basis of the position-determining device and the pressure sensor during the movement of the mould cavity opening of the at least one mould cavity and the dispensing mouth of the filling device with respect to each other in such a manner that, after the front edge of the mould cavity opening and the front edge of the dispensing mouth have been moved with respect to each other over the filling length and the pump has displaced the volume of the foodstuff which substantially corresponds to the volume of the at least one mould cavity from the dispensing mouth into the at least one mould cavity, the pump brings the foodstuff which is situated in the at least one mould cavity to a predetermined pressure which has been input into the control unit.

3. Moulding device according to claim 1, wherein the filling length is smaller than 50% or 40% or 30% of the distance between the front edge and the rear edge of the mould cavity opening, viewed in the direction of the movement path.

4. Moulding device according to claim 1, wherein the filling length is smaller than 20 mm.

5. Moulding device according to claim 1, wherein the dispensing mouth of the filling device is held in a substantially fixed position, and wherein the mould cavity opening is movable by the drive device along the movement path with respect to the dispensing mouth.

6. Moulding device according to claim 1, wherein the mould member comprises a moulding roller which is rotatable about an axis of rotation by said drive device, and wherein the moulding roller has a moulding roller peripheral wall which defines the moulding surface, and wherein the movement path is determined by a direction of rotation of the moulding roller about the axis of rotation.

7. Moulding device according to claim 1, wherein the at least one mould cavity comprises a bottom and a peripheral wall, and wherein the peripheral wall extends from the bottom and defines the mould cavity opening.

8. Moulding device according to claim 1, wherein the mould cavity opening of the at least one mould cavity has a substantially round shape.

9. Moulding device according to claim 1, wherein the mould cavity opening of the at least one mould cavity has a substantially oval shape, wherein the mould cavity opening has a length which extends in the direction of the movement path between the front edge and the rear edge of the mould cavity opening, and wherein the mould cavity opening has a width which extends in a direction transverse to the movement path, and wherein the length of the mould cavity opening is unequal to the width of the mould cavity opening.

10. Moulding device according to claim 1, wherein the filling device comprises an abutment surface in which the dispensing mouth is provided, and wherein the abutment surface sealingly abuts the moulding surface of the mould member during the movement of the mould cavity opening of the at least one mould cavity and the dispensing mouth of the filling device with respect to each other.

* * * * *

UNITED STATES PATENT AND TRADEMARK OFFICE
CERTIFICATE OF CORRECTION

PATENT NO. : 9,526,269 B2  
APPLICATION NO. : 14/118613  
DATED : December 27, 2016  
INVENTOR(S) : Hendrikus Cornelis Koos Van Doorn et al.

Page 1 of 1

It is certified that error appears in the above-identified patent and that said Letters Patent is hereby corrected as shown below:

On the Title Page

In item (73), in Column 1, in "Assignee", Line 1, delete "Procesing" and insert -- Processing --, therefor.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*